Aug. 5, 1924.
J. M. PROCTOR
1,503,849
BEARING CARRIER NUT
Filed May 15, 1920
2 Sheets-Sheet 1
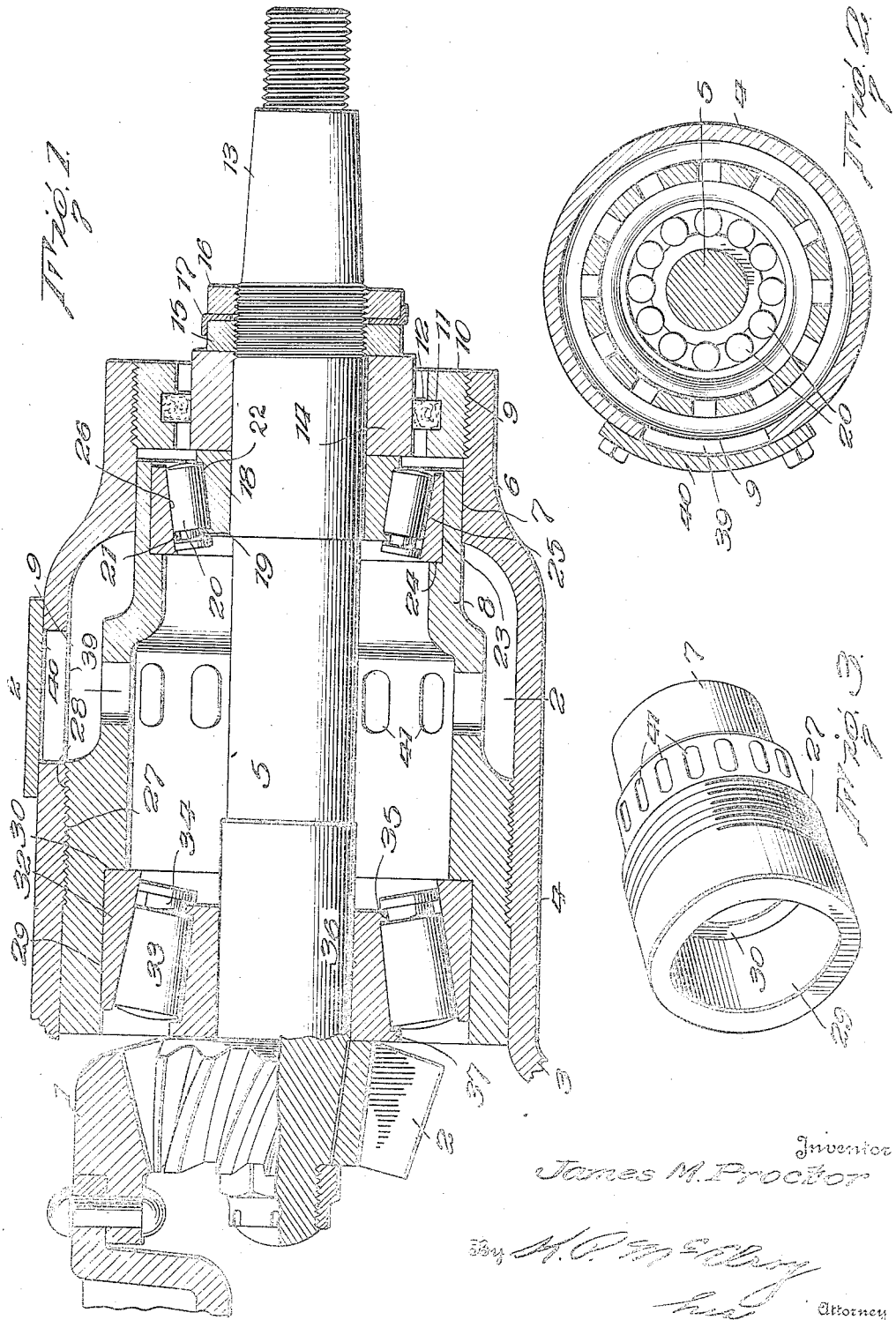
Inventor
James M. Proctor
By
Attorney

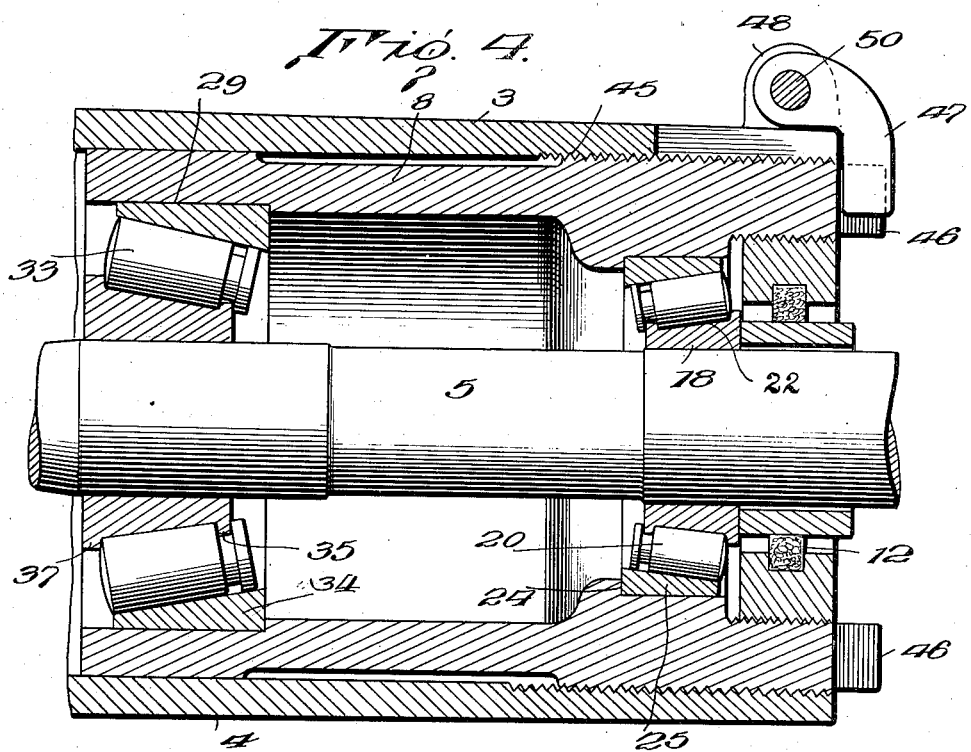
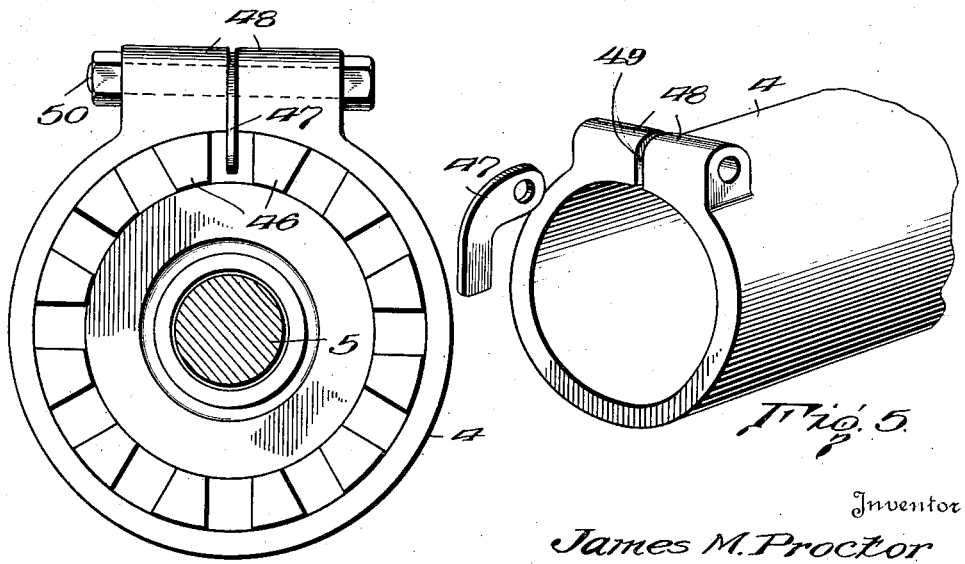

Patented Aug. 5, 1924.

1,503,849

UNITED STATES PATENT OFFICE.

JAMES M. PROCTOR, OF SHREVEPORT, LOUISIANA.

BEARING CARRIER NUT.

Application filed May 15, 1920. Serial No. 381,732.

*To all whom it may concern:*

Be it known that I, JAMES M. PROCTOR, a citizen of the United States, residing at Shreveport, in the parish of Caddo and State of Louisiana, have invented certain new and useful Improvements in Bearing Carrier Nuts, of which the following is a specification.

This invention relates to improvements in bearing carrier nuts and it comprises a carrier nut or sleeve provided with means at either end for positioning and retaining race rings and their roller bearings, and arranged to be mounted in a housing over a shaft or spindle or the like; and it more particularly comprises a roller bearing carrier nut or sleeve provided with means for holding and retaining roller bearing race ways and roller bearings in operative position in combination with the pinion shaft of the rear end or differential of an automobile; whereby the nut may be readily removed from the casing for replacement of the bearings or for adjustment; all as more fully hereinafter set forth and as claimed.

In the usual construction of the pinion shaft of the rear end or differential of an automobile the parts are difficult of access for renewal, adjustment or repair, it being frequently necessary to disassemble the differential and especially to remove the housing or casing around the spindle. It is an object of my invention to provide a simple and effective roller bearing assembly nut which may be cheaply manufactured and which may be easily and quickly placed in and removed from position in the housing, as well as enabling adjustments of the bearings to be easily made.

While the details of my improvement are useful in many connections, I have shown and illustrated my invention as applied to the pinion shaft of the rear end or differential of an automobile.

In the accompanying drawings showing two forms of a specific embodiment of my invention, Figure 1 is a longitudinal sectional view of my improved bearing carrier nut as applied to the pinion shaft housing of a differential gear casing of an automobile;

Figure 2 is a longitudinal sectional view taken on the line 2—2 of Figure 1;

Figure 3 is a perspective view of the retaining means for supporting the circular series of roller bearings in place in the housing.

Figure 4 is a longitudinal sectional view of a different form of the invention;

Figure 5 is a segmental detail perspective; and

Figure 6 is an end elevation of Figure 4.

Referring to Figures 1, 2 and 3 of the drawings, 11 indicates the ring gear of the differential of an automobile and 2 the pinion gear mounted in the usual manner in the housing 3. This housing has the forwardly extending shaft-supporting portion 4 in which the pinion shaft 5 rotates. This is the usual construction and is not here claimed as my invention except so far as it operates in combination with my improved bearing assembly nut.

The forward end of the housing is contracted as at 6 and has the plain bearing surface 7 for supporting the forward end of the sleeve or nut 8 (more fully hereinafter described). The housing 3 at its forward end is internally screw threaded as at 9 for receiving the complementary screw threaded sleeve 10 having the groove 11 on its inner periphery adapted to receive and retain the felt or other elastic washer 12. Surrounding the shaft at this point and contacting with the washer 12 is a closely fitting sleeve 14. This construction provides a dust and oil tight joint and permits free rotation of the shaft. The sleeve 14 is locked upon the shaft 5 by means of a double lock nut comprising the nuts 15 and 16 with the lock washer 17 therebetween. The inner end or face of the sleeve 14 engages the inner end or face of the race ring 18 which closely fits the periphery of the shaft 5. This race ring 18 is held against longitudinal movement on the shaft through its locking engagement with the roller bearings. The roller bearings 20 are provided with the annular grooves 21 into which the annular flange 19 of the race ring 18 fits. The race ring 18, as shown, has the bearing surface 22 tapered outwardly.

The outer end of the nut or sleeve 8 is provided with a reduced portion 23 forming an abrupt shoulder 24. The race ring 25 having its inner face tapered at 26 and corresponding with the taper of the ring 18 fits in this reduced portion of the nut or sleeve 8 with its outer face in the shoulder 24.

The sleeve or nut 8 near its rear end (toward the differential) is provided with external threads 27 arranged to screw into the complementary internal threads 28 on the inner periphery of the housing 3. This construction permits securing the sleeve or nut 8 in the casing and permits of proper positioning of the bearings.

The rear end of this sleeve or nut 8 is provided with the enlarged bore 29 having an abrupt shoulder 30 which limits the inward movement of the race ring 32. The outer bore of the race ring 32 closely fits in the bore 29. The inner periphery of the ring 32 is arranged at an angle for receiving the roller bearings 33 of the rear series. These rollers are similar to the forward roller bearings described. They are provided with peripheral grooves into which extends the flange 35 carried by the outer ends of the race ring 36. This ring 36 is provided with a slanting bearing surface corresponding with that of the ring 32. The rear end of the ring 36 is provided with an outwardly extending flange 37 adapted to extend beyond the rear end of the bearings. This construction, as is understood, prevents longitudinal movement of the bearing.

The construction described permits free removal of the nut or sleeve 8 from the housing 4. The housing is provided with the opening 39 normally closed by a cover 40 having a tight joint to prevent leakage of the grease or oil from the casing. The cover may be retained in position by means of bolts or the like and when it is removed permits the insertion of the tool for turning the carrier nut or sleeve 8. This nut or sleeve is provided with a plurality of circumferential openings 41 for reception of the tool.

The provision of the single carrier nut or sleeve 8 permits easy adjustment of the bearings and ready assembling and removing of the parts. To remove the carrier nut or sleeve 8 with its assembled rings and bearings the pinion gear 2 should be removed from the shaft 5. The roller bearings assembly may then be readily removed from the housing 3 without removing the housing from the machine and without removal of the shaft.

The construction also provides for ready access to either one or the sets of bearings, the pinion 2 being removed for access to the rear bearings 33 and the lock nuts 15 and 16 together with the sleeves 10 and 14 being removed for access to the forward bearings 20.

Referring to the form shown in Figures 4, 5 and 6, the same reference letters designate corresponding parts where applicable. In this form the casing 3 is provided interiorly with screw threads 45; the sleeve 8 is substantially straight to correspond with the form of the casing. The sleeve is provided at either end with the shoulders for retaining the roller bearing race-ways as is shown also in Figures 1, 2 and 3, but in this form, as shown in Figures 4, 5 and 6 it is provided with a series of integral lugs 46 extending slightly past the casing when the sleeve is in position. This form of sleeve in combination with the casing provides for removal of the nut with the bearings and this shaft at the forward end of the casing. In order that the sleeve may be locked in position, it is desirable to insert a locking strip 47 between the bolt lugs 48, the casing being split at its forward end a slight distance, as shown at 49, and provided with these lugs 48 and the bolts 50 for adjustment. While I have described in detail a form of roller bearings, which may be used in combination with my invention, it is to be understood that this is for the purpose of illustration only, and that any other bearings may be used in the unit assembly.

Having described my invention, what I claim is:

1. In combination with a shaft-enclosing housing having an internally threaded portion and a shaft therein, of a carrier nut comprising a sleeve having external threads engaging the internal threads of the housing, said sleeve provided at each end with means for receiving bearing race rings for bearings, race rings and bearings in said means, means to move the sleeve longitudinally in the housing to tighten or loosen the bearings at one end of the sleeve, and means for adjusting the bearings at the opposite end of the sleeve.

2. In combination with a housing enclosing a shaft and having an opening intermediate its end and an internally threaded portion adjacent one end, of a carrier nut comprising a sleeve having external threads adjacent one end for engaging the internal threads of the housing and the opposite end of the sleeve closely fitting the interior bore of the housing, means at each end of the carrier nut for supporting bearing rings, said carrier nut having a wrench receiving portion opposite the opening in the housing, whereby the sleeve is moved longitudinally in the housing for removing the same therefrom or for tightening or loosening the bearings at one end of the sleeve and means for adjusting the bearing at the opposite end of the sleeve.

3. The combination with a shaft-enclosing housing and a shaft therein, of a carrier nut comprising a sleeve having a longitudinal adjustable connection with the housing, said sleeve provided at each end with means for receiving bearing race rings for bearings, race rings and bearings in said means, means for adjusting the sleeve longitudinally in the housing to tighten or loosen the bearings at one end of the sleeve and means for adjusting the bearings at the opposite end of the sleeve.

In testimony whereof, I affix my signature.

JAMES M. PROCTOR.